Aug. 6, 1940.   P. H. STANLEY   2,210,190
FAIRING FOR AIRCRAFT SUSTAINING ROTORS
Filed Sept. 21, 1938

INVENTOR
Paul H. Stanley
BY
Symestvedt & Lechner
ATTORNEYS

Patented Aug. 6, 1940

2,210,190

UNITED STATES PATENT OFFICE 2,210,190

FAIRING FOR AIRCRAFT SUSTAINING ROTORS

Paul H. Stanley, Huntingdon Valley, Pa., assignor, by mesne assignments, to Autogiro Company of America, a corporation of Delaware Application September 21, 1938, Serial No. 230,923

15 Claims. (Cl. 244—130)

This invention relates to a fairing for an aircraft sustaining rotor and is especially concerned with a fairing for the type of rotor in which the blades or wings are movably or pivotally mounted on a common central hub.

In an aircraft of the character mentioned above, the root ends of the several blades are commonly pivoted to the hub to provide freedom for movement of the blades at least in paths generally transverse the rotative path of travel. In addition, pivot means are frequently employed permitting blade movement generally within the rotative path of travel, and in some instances the pivot means provide for pitch change movements of the blades substantially about their longitudinal axes. In addition, the rotor hub is frequently mounted for tilting movement in all directions for purposes of control of the craft in flight. The hub and/or the root ends of the blades may also be provided with blade movement controlling devices such, for example, as controllable mechanism for changing the blade pitch. These pivot and other mechanisms associated with the hub and blades set up a substantial amount of parasite drag and also impair smooth or "streamlined" appearance. Moreover, the blade pivot and other devices incorporated in the rotor head have heretofore remained substantially unprotected from atmospheric conditions.

With the foregoing in mind, the present invention provides a novel fairing joining the root ends of the blades of the sustaining rotor and enclosing the hub thereof and all or substantially all of the mechanisms which may be associated therewith.

The invention also contemplates sectionalizing of the fairing in such manner as to permit ready attachment and detachment thereof, or opening of a portion thereof to gain access to mechanisms lying within. In addition, the sectionalizing of the fairing permits relative separation of certain portions thereof so as to provide for folding of the rotor blades when desired.

In accordance with the preferred form of fairing, inflatable means are employed whereby to retain the shape of the fairing, the entire fairing structure being flexible and yieldable so as to permit freedom for all movements of the blades with respect to the hub.

The foregoing and other objects and advantages will appear more fully from the following description referring to the accompanying drawing, in which—

Figure 1:
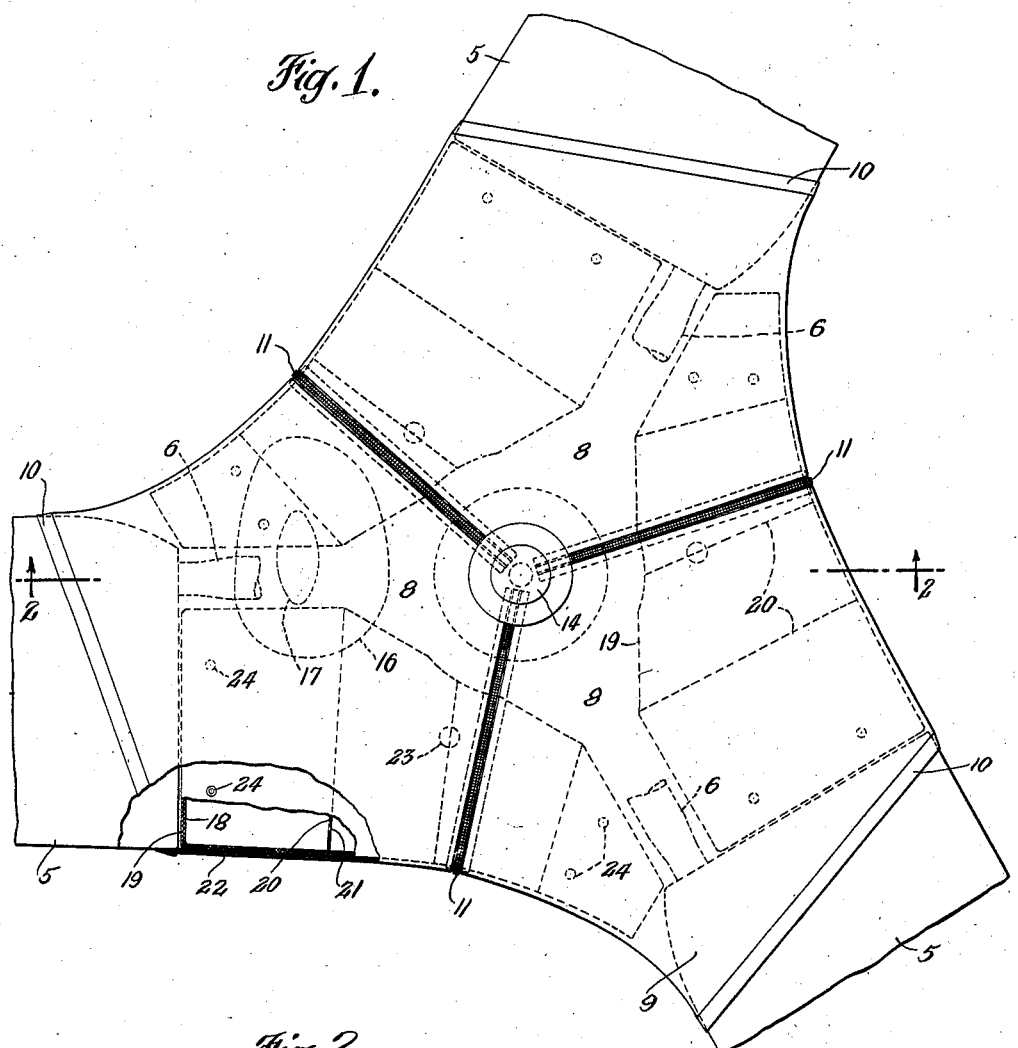
Figure 2:
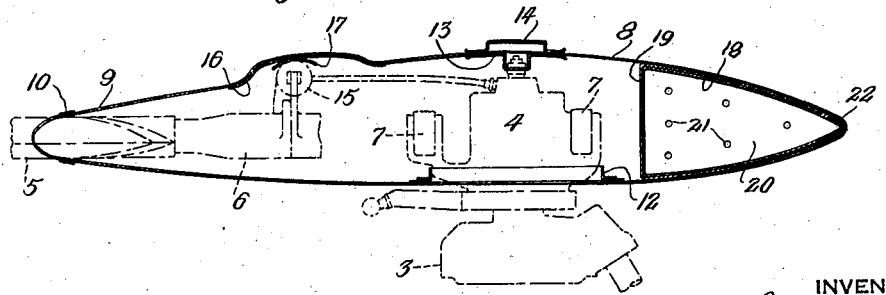

Figure 1 is a top plan view of the fairing applied to a three bladed rotor, certain portions being broken away and shown in horizontal section; and Figure 2 is a vertical sectional view taken generally as indicated by the section line 2—2 on Figure 1.

In Figure 2 a non-rotative hub mounting appears in outline at 3, the rotative hub proper being indicated by the numeral 4. The blades 5 are provided with main longitudinal spars 6 by means of which they are connected with the hub 4. Blade pivot mountings 7 appear in Figure 2 in outline. This general type of blade mounting need not be considered in detail herein since it forms no part of the present invention per se. For reference, however, it is noted that a mounting of this general type is fully disclosed in copending application of Agnew E. Larsen, Serial No. 204,283, filed April 26, 1938.

In general, the fairing may be divided into two portions, i. e., an outer covering and an inner air cell structure. The covering is desirably made of rubberized fabric and is divided into sections 8, one for each blade. Each section has a neck portion 9 fitting the root end of one of the blades and secured thereto, for example, by a plain fabric strip 10 doped to the fairing and also to the blade. The inner or free edges of each section terminate in radial planes containing the hub axis, which planes lie intermediate the longitudinal axis of the blades, as clearly seen in Figure 1, and the adjacent or meeting edges of the several sections are serially joined together around the hub by means of separable fastener means as, for example, the well known slide fastener, these being shown at 11. Each of the slide fasteners extends around the outer edge of the fairing and on the lower as well as on the upper sides thereof, above and below the hub. By this means the fairing covering may readily be opened along lines intermediate the blades, and the adjacent edges folded back to gain access to blade pivots or other parts lying within, or for the purpose of permitting folding of the blades, for example in the manner fully disclosed in Cierva Patent No. 1,994,465, in accordance with which the several blades are all brought into substantial parallelism over the body of the craft.

If desired, at the underside of the fairing material, around the lower edge of the hub 4, an angular reinforcing element or the like 12 may be employed, which element will also serve to center the fairing with respect to the hub. Similarly, on its upper side, the central portion of the fairing sheet may be connected with the hub by means of the dished member 13, and a closure cap 14 may also be applied at the upper surface.

The outer edge portions of each section of the fairing may be reinforced as by applying and doping a fabric strip 22, as clearly appears at the lower left-hand portion of Figure 1 and at the right of Figure 2.

As seen in Figure 2, the form of blade mounting illustrated includes pitch change mechanism such as the hydraulic cylinder 15, which may conveniently be of the type disclosed in copending application of James G. Ray, Serial No. 91,838, filed July 22, 1936. To accommodate this mechanism, the fairing sheet may be reinforced in the neighborhood of the cylinder 15 by means of a sheet 16 made, for example, of leather, and also a metal abrasion plate 17 adapted to contact with the cylinder 15.

Interiorly of the fairing are disposed inflatable rubber air cells or bladders for the purpose of retaining the fairing shape. As seen in Figure 2, these cells are preferably of double walled construction, including an inner layer 18 of rubber and an outer layer 19 of leather or of certain types of fabric having substantial strength. Each of these cells (indicated by the outline 19 in Figure 1) extends substantially throughout the entire distance from the root end of one blade to the root end of an adjacent blade, the shape being such as to accommodate the blade spars 6 and other devices lying within the fairing. A plurality of generally upright partition walls 20 aid in retaining the bladder shape, these walls being perforated as indicated at 21 to provide for equal pressure throughout.

Any suitable means, such as a filling valve diagrammatically indicated at 23, may be employed for inflating the air cells.

The air cells may also be secured in their proper positions within the fairing by means of separable snap fasteners 24, one portion of which is carried on the outer wall 19 of the cells and the other portion of which is carried on the inner surface of the fairing.

According to the foregoing, the invention provides a flexible hub fairing which accommodates all desired movements of the blades with respect to the hub and which, while affording effective protection for the hub and devices associated therewith, at the same time permits ready separation of sections for purposes of inspection, lubrication, blade folding and the like.

It is particularly to be noted that the structure of the interior air cells and of the fairing proper is so arranged that the desired fairing shape is readily maintained even when employing only very low pressure in the cells. The inflatable cells, moreover, may readily be removed and replaced because of the sectionalizing of the fairing covering, it being only necessary to separate two adjacent sections by means of the slide fastener and then disconnect the snap fasteners 24.

As will be seen from examination of Figure 2, the external contour of the fairing approximates an aerofoil section on a line extended through the hub axis along the longitudinal axis of any blade. This is of advantage aerodynamically.

What I claim is:

1. For an aircraft sustaining rotor incorporating a hub and blades movably mounted thereon, a flexible fairing joining the root ends of the blades and enclosing the hub, and inflatable air cell means for maintaining the shape of the fairing.

2. For an aircraft sustaining rotor incorporating a hub and blades movably mounted thereon, a flexible fairing joining the root ends of the blades and enclosing the hub, and inflatable air cell means for maintaining the shape of the fairing, the fairing being sectionalized and adjacent edges thereof being provided with separable fastener means.

3. For an aircraft sustaining rotor incorporating a hub and blades movably mounted thereon, a fairing for the root ends of the blades and the hub made of sheet material, the sheet material of the fairing being sectionalized and one section being associated with each blade and extended from the root end thereof toward an adjacent blade and toward the hub, and separable fastener means associated with adjacent edges of the several sections.

4. For an aircraft sustaining rotor incorporating a hub and blades movably mounted thereon, a fairing for the root ends of the blades and the hub made of sheet material, the sheet material of the fairing being sectionalized and one section being associated with each blade and extended from the root end thereof toward an adjacent blade and toward the hub, the several sections of the fairing material having meeting edges extended along lines radiating from the hub axis intermediate the longitudinal axes of the blades, and separable fastener means interconnecting the sections.

5. For an aircraft sustaining rotor incorporating a hub and blades movably mounted thereon, a fairing for the root ends of the blades and the hub made of sheet material, the sheet material of the fairing being sectionalized and one section being associated with each blade and extended from the root end thereof toward an adjacent blade and toward the hub, the several sections of the fairing material being separable and having meeting edges extended along lines radiating from the hub axis intermediate the longitudinal axes of the blades, and inflatable cell means disposed within the fairing and supporting the flexible material thereof in regions intermediate the root ends of the blades.

6. For an aircraft sustaining rotor incorporating a hub and blades movably mounted thereon, a fairing for the root ends of the blades and the hub made of sheet material, the sheet material of the fairing being sectionalized and one section being associated with each blade and extended from the root end thereof toward an adjacent blade and toward the hub, the several sections of the fairing material having meeting edges extended along lines radiating from the hub axis intermediate the longitudinal axes of the blades, and a separable slide fastener for interconnecting meeting edges of at least two of the sections, said slide fastener lying generally in a radial plane containing the axis of the hub intermediate the longitudinal axes of the blades and being extended around the edge of the fairing and also on the upper and lower faces thereof.

7. For an aircraft sustaining rotor having blades pivotally connected with a hub, an inflatable hub fairing enclosing the hub and having neck portions joining with the root ends of the several blades.

8. For an aircraft sustaining rotor having blades pivotally connected with a hub, an inflatable hub fairing having neck portions joining with the root ends of the several blades, the fairing being sectionalized and the sections being provided with separable fastening means intermediate the blades.

9. For an aircraft sustaining rotor incorporating a hub and blades movably mounted thereon, a fairing joining the inner ends of the blades and enclosing the hub, said fairing being made of flexible sheet material, and inflatable air cell means lying within the fairing and extended substantially from the root end of one blade to the root end of an adjacent blade.

10. For an aircraft sustaining rotor incorporating a hub and blades movably mounted thereon, a fairing joining the inner ends of the blades and enclosing the hub, said fairing being made of flexible sheet material, and inflatable air cell means lying within the fairing and extended substantially from the root end of one blade to the root end of an adjacent blade, the sheet material of the fairing being divided or sectionalized at least along a line between a pair of adjacent blades.

11. For an air rotor comprising a hub and blade means joined thereto, an inflatable fairing of flexible material constructed to substantially enclose the hub and so formed that when inflated it presents a substantially smooth or streamlined external surface around the hub adjacent the juncture of the blade means therewith.

12. For an air rotor comprising a hub and a blade having flexible connection thereto, an inflatable fairing of flexible material constructed to substantially enclose the hub and said flexible connection and so formed that when inflated it presents a substantially smooth or streamlined external surface around the hub and said flexible connection.

13. An air rotor comprising a hub, blades, pivot means mounting the root ends of the blades on the hub, and a readily flexible fairing connected with the root ends of the blades to receive support therefrom and extended from the blade root of one blade to the blade root of another blade and substantially enclosing the hub and the pivoted juncture of the several blades with the hub.

14. An air rotor comprising a hub, blades, pivot means mounting the root ends of the blades on the hub, and an inflatable fairing connected with the root ends of the blades to receive support therefrom and extended from the blade root of one blade to the blade root of another blade and substantially enclosing the hub and the pivoted juncture of the several blades with the hub.

15. An air rotor comprising a hub, blades, pivot means mounting the root ends of the blades on the hub, and an inflatable readily flexible fairing connected with the root ends of the blades to receive support therefrom and extended from the blade root of one blade to the blade root of another blade and substantially enclosing the hub and the pivoted juncture of the several blades with the hub.

PAUL H. STANLEY.